April 27, 1954   M. ST. G. JENSEN   2,677,007
RETAINER AND SEPARATOR MATS FOR STORAGE BATTERIES
Filed Feb. 3, 1949
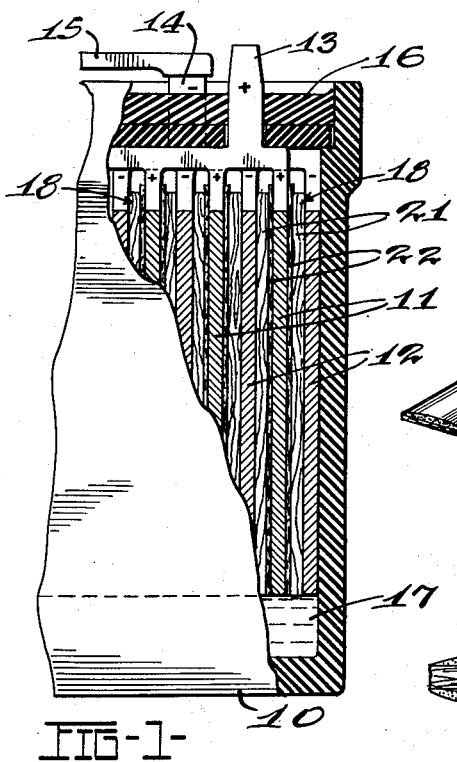
FIG-1-
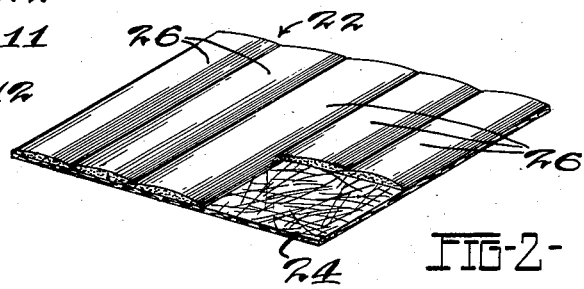
FIG-2-
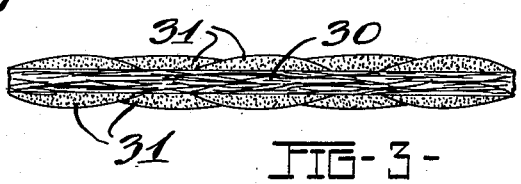
FIG-3-
FIG-4-
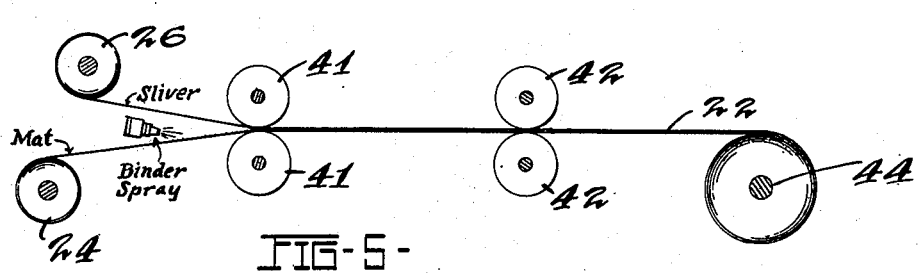
FIG-5-
INVENTOR.
MEREDITH ST.G. JENSEN.
BY
Staelin Overman
ATTYS.

Patented Apr. 27, 1954

2,677,007

UNITED STATES PATENT OFFICE 2,677,007

RETAINER AND SEPARATOR MATS FOR STORAGE BATTERIES

Meredith St. George Jensen, Toledo, Ohio, assignor to Owens-Corning Fiberglas Corporation, a corporation of Delaware Application February 3, 1949, Serial No. 74,333

10 Claims. (Cl. 136—145)

This invention relates to a composite product formed of glass fibers and more particularly to an insulating separator construction especially usable for spacing the plates in a storage battery and to the method of making the product.

In the manufacture of storage batteries it is necessary to space the negative and positive plates by suitable means and insulating means termed separators for this purpose have been made of various materials, as for example, wood and rubber. Rubber is most generally used at present for plate separators in heavy duty batteries but wood is also in use. The separator is ribbed on the side adjacent the positive plate. This construction permits substantially uninterrupted flow of the electrolyte and facilitates the escape of gas evolved at the positive plates. In use, however, the ribbed separators may fracture or split and permit the lead peroxide or other active material to build up or grow across the space between adjacent plates through the fracture in the separator. This results in decreased effectiveness and eventually in battery failure. The bridging of the space between adjacent plates by the loosened material is usually referred to as "treeing." Also, the ribbed surface of the separators permit the active material to loosen and fall away from the positive plate, and as this progresses, the battery loses its ability to function at rated capacity.

One of the major disadvantages of the various types and character of separator heretofore used is that if the separators are formed so as to snugly engage the positive plates in a manner to prevent shedding of the active material, the intimate surface contact of the separator decreases the effective action of the electrolyte by impairing the free flow of electrolyte into contact with the positive plate. This condition increases the internal resistance of the battery with a consequent corresponding decrease in efficiency of the battery.

The present invention embraces the provision of a composite product fabricated of fibrous material which is particularly useful as an insulator or insulating separator for the plates of a storage battery.

An object of the invention is the provision of a composite mat fabricated of fibers, preferably glass fibers or filaments, arranged in a manner suitable for use as an insulator in storage batteries wherein the mat in the region of one surface that engages a battery plate is replete with very small pores for effectively retaining the active material on the plates, the interstices or between adjacent glass filaments or fibers facilitating the flow of electrolyte while retaining the active material to promote efficient operation of a battery.

Another object of the invention resides in the provision of a composite product formed of glass fibers or filaments which may be usable in conjunction with a wood separator or separators of other material or which may be fashioned in a manner to be self-supporting and usable per se as a battery plate separator.

The further object of the invention resides in the provision of a composite article or unit wherein a supporting sheet or foundation formed of relatively coarse fibers of glass disposed in random relation is integrated with a suitable binder to impart a semi-rigid character to the sheet and upon which is disposed a quantity of staple sliver providing a high degree of surface resilience by reason of the presence of the staple sliver.

Another object of the invention is the provision of a novel method of joining a group or groups of glass sliver to a base, supporting mat, or web in a manner to facilitate manufacture by a commercially practicable continuous process whereby the composite product may be produced at low cost.

Still another object of the invention resides in the provision of a method of applying a layer or layers of staple sliver upon a fibrous glass supporting sheet or web utilizing a bonding agent to secure relatively slight adhesion of the sliver to the sheet whereby a desirable degree of resilience in the layer of sliver is obtained.

Another object is the provision of a method of applying groups or strands of glass sliver to a supporting mat in parallel overlapping relation resulting in substantial uniformity in porosity of the product rendering the same particularly adaptable and commercially practicable as a plate retainer mat or separator for storage batteries.

Another object is the provision of a composite product fabricated of glass fibers particularly usable as a battery retainer mat or insulator, the fibers being arranged and disposed as to facilitate escape of gas evolved at the positive plate as well as to provide a resilient plate-engaging surface serving to minimize the shedding of active material from the plate.

Further objects and advantages are within the scope of this invention, such as relate to the arrangement and function of the related elements of the structure, to various details of construction and method of producing the structure, and to economies of manufacture and numerous other features as will be apparent from a consideration of the specification and drawings of forms of the invention which may be preferred, in which:

Figure 1 is a longitudinal sectional view showing a portion of a storage battery embodying a form of a product of my invention utilized as a battery plate retaining means;

Figure 2 is a greatly enlarged isometric view illustrating one form of the composite article or product of my invention particularly illustrating the overlapping relation of the groups or strands of staple sliver arranged on a supporting sheet;

Figure 3 is an enlarged end view of another form of the product illustrating the relative position of groups of staple sliver arranged on each uniplanar surface of a fibrous backing sheet or core;

Figure 4 is an end view of a composite article or product illustrating another form of the invention; and Figure 5 is a schematic view illustrating steps in a method of my invention for forming the product Referring to the drawings in detail and first to Figure 1, I have illustrated a portion of a storage battery having a casing 10 of hard rubber, asphaltic compound, or other suitable nonconducting material which encloses a number of cells, each comprising an assembly of alternately arranged positive plates 11 and negative plates 12. The positive plates 11 of each cell are joined together and to a terminal post 13, and the negative plates 12 joined together and to a terminal post 14, the latter being connected to the positive terminal of an adjacent cell (not shown) by means of a connector or bar 15. Each cell is sealed by means of a suitable asphaltum compound 16. Both positive and negative plate assemblies are supported above the bottom wall or base of the casing 10 by a plurality of upwardly-extending spaced ribs 17 providing a chamber beneath the plates for the reception of material that may become dislodged from the plates.

Disposed between each negative and positive plate is a separator or insulator construction 18, the construction of which forms a part of the present invention. The separators serve several purposes, the most important being to maintain the plates in proper spaced relation and to aid in preventing the shedding of active material from the positive plates.

In one form of the present invention the separator construction includes a wood separator 21 and between the wood separator and the positive plate a retainer mat or unit 22, a form of the retainer mat or composite product formed of glass fibers being illustrated in Figure 2. This product or article includes a base, mat, backing sheet or web 24 fabricated of glass fibers arranged irregularly or at random, the fibers being bonded into an integral uniplanar mass by means of a suitable bonding agent or binder such as polystyrene resin, starch, gelatin, phenol formaldehyde resin, or furfural resin. The fibers or filaments of the backing sheet or base 24 are usually of from .0005 to .0006 inch in diameter, although glass fibers of other diameters may be utilized to form the base or foundation of the product made according to the present invention. The sheet 24 may be made in any suitable fashion, for example, in the way disclosed in the Slayter Patent No. 2,306,347, dated December 22, 1942.

As shown in Figure 2 there is supported upon the base 24 a plurality of groups, strands or layers 26 of glass filaments or fibers, herein referred to as staple sliver, preferably arranged in overlapping relation. The groups or layers 26 of staple sliver are arranged in substantially parallel relation. The layer or layers of sliver are preferably slightly adhered or adhesively joined to the mat 24 through the use of a suitable binder or bonding agent which may be applied either to the layers of sliver or the foundation mat 24 at or during the process of laying the sliver on the mat. I have found that gelatin, starch, polystyrene, methyl methacrylate, furfural and like materials provide a satisfactory bonding agent for this purpose. The individual filaments of the staple sliver are preferably formed about .00023 inch in diameter although other sizes may be employed without departing from the scope of the invention. The sliver is preferably without any twist and of a size running about 600 yards per pound but other sizes are usable. It may be made by any suitable method such as that disclosed in the Tucker and Lannan Patent No. 2,264,345, dated December 2, 1941.

I have found in practice that a commercially usable and acceptable battery insulator or retainer mat of this character used in conjunction with a wood separator may be formed by employing a base or backing sheet 24 of a thickness of approximately .010 inch on which partially overlapping staple slivers are laid, each sliver being from ¼ inch to ½ inch in width and overlapping adjacent slivers by about ⅛ to ¼ of its width.

As will be apparent from Figure 2, the several overlapping slivers provide a reasonably tight, unbroken insulating screen which when placed in intimate contact with the battery plate surface has been found very effective in preventing the shedding of the active plate materials and in other ways prolonging the life of the battery. The layer of staple sliver on the base mat 24 provides a degree of resilience tending to hold or retain the active material in the grid of the positive plate. The exceptional fineness of the individual filaments or fibers making up the layer or layers of sliver form a great number of interstices among the filaments providing minute pores through which the electrolyte may readily flow over the entire areas of the plates. The product of the present invention provides an effective means for maintaining the active material in the grids of the positive plates without impairing the efficiency of the battery or increasing its internal resistance.

As shown in Figure 1, a battery retainer mat construction of the character shown in detail in Figure 2 may be disposed at both sides of each positive plate, between the plate and the separator 21.

Ordinarily the space between adjacent positive and negative plates of a storage battery is from .05 inch to .09 inch. I have found that the mat 24 may be of a thickness of about .010 inch and the composite sliver and mat construction 22 illustrated in Figure 2 may be, when uncompressed, about .020 inch thick and may be inserted at each side of the positive plate so that the exterior surfaces of the sliver are in snug contact with the surfaces of the plates.

My invention includes the fabrication of a composite mat and sliver construction of a thickness so as to be self-supporting and usable per se as the separator or insulator between adjacent battery plates. To this end the composite product may be fashioned in the form shown in Figure 3 wherein a mat or core 30 is made of greater thickness than the mat 24 but manufactured in the same manner of glass fibers disposed in random formation held together by a suitable binder. Upon one or both surfaces of the mat or core 30 there is applied layers 31 of groups of glass filaments or sliver designated 31 arranged in overlapping relation as illustrated in Figure 3 to form a substantially tight unbroken screen affording ample porosity to facilitate substantially free flow of electrolyte over the areas of the plates and at the same time prevent or minimize the shedding of active material. The combined thickness of the mat 30 and layers of sliver is such as to snugly occupy the entire space between adjacent positive and negative plates.

In the forms of the product illustrated in Figures 2 and 3, the filaments of the sliver tend to cohere together so that only a relatively small amount of binder or bonding agent serves to cause the filaments disposed immediately adjacent the base or backing sheet to be adhesively joined thereto.

The composite fibrous sheet and sliver construction may, if desired, be made in the form illustrated in Figure 4 in which the glass sliver 34 laid down upon the mat or sheet 35 is of sufficient width so that one sliver covers the whole mat. In this form of product, a suitable binder as, for example, gelatin or starch may be used to join the layer of sliver to the sheet 35. A second layer of sliver may be placed on the opposite side of the core 35 in producing a separator of the general character shown in Figure 3.

Figure 5 diagrammatically illustrates steps in a method of forming the fibrous mat and sliver construction. In carrying out the method, a supply of prefabricated mat or fibrous sheet 24 is positioned in advance of compression rolls 41 and a supply of staple sliver 26 is supported in a position so that the sliver may be conveyed through the rolls 41 simultaneously with the movement of the mat 24 through the rolls. A suitable binder is sprayed or otherwise deposited upon the mat or upon the groups or strands of sliver before the mat and sliver are brought into contact or engagement through rotation of the rolls 41. A second set of compression rolls 42 is spaced from the rolls 41 to provide a time interval to facilitate the setting or hardening of the binder before the composite or end product 22 is conveyed to a collecting roll 44. In lieu of the specific application of a binder, the base or mat 24, if formed with a thermoplastic bonding agent, such as polystyrene resin, may be heated sufficiently to soften the binding agent whereby the sliver may be anchored to the mat 24 through the softening and subsequent setting of the binding agent in the mat.

The same principle or method may be used in producing the composite structures shown in Figures 3 and 4, the latter form in addition requiring the application of sliver to the opposite surface of the mat as the mat moves through the compression and conveyor rolls 41.

It is to be understood that the figures and dimensions given herein as to the size of glass filaments and the thickness of the backing sheet or web are given by way of example and are not to be taken as limitations of the present invention.

It is apparent that, within the scope of the invention, modifications and different arrangements may be made other than is herein disclosed, and the present disclosure is illustrative merely, the invention comprehending all variations thereof.

I claim:

1. An article of manufacture including in combination, a sheet formed of glass fibers wherein the individual fibers are arranged in random relation, a bonding agent for maintaining the fibers of the sheet in assembled relation, a plurality of layers of unbonded glass sliver supported on said sheet in parallel relation, said layers of sliver being adhesively joined to said sheet.

2. A retainer mat for battery plates including, in combination, a group of glass fibers, means for securing said fibers in integrated condition, a quantity of unbonded glass sliver disposed on the group of glass fibers with the filaments of the sliver arranged in substantially parallel relation, said sliver being adhesively joined to the group of fibers.

3. An electric storage battery including a plurality of alternately arranged positive and negative plates, insulating means disposed between adjacent plates, said insulating means including a fibrous glass base, a quantity of unbonded staple sliver formed of glass filaments supported on the fibrous base, the filaments of the sliver being disposed in substantially parallel relation, said sliver being arranged in intimate surface engagement with the positive plates.

4. An insulator for battery plates including a supporting web formed of glass fibers bonded together, a layer of glass filaments supported on said web, the filaments of the layer being disposed in substantially parallel relation, said layer being unbonded and compressible in a direction transverse to the normal plane of the web and arranged to resiliently engage substantially the entire surface of a battery plate.

5. A method of forming a fibrous glass structure including the steps of directing a layer of bonded glass fibers and a layer of unbonded glass filaments into juxtaposed surface engagement, of applying a comparatively small amount of adhesive to one of said layers, and of applying a comparatively light pressure to cause only the outermost filaments of the filament layer in contact with the layer of glass fibers to be joined through the medium of the adhesive.

6. A method of producing a battery plate retainer including continuously moving a bonded mat of glass fibers, of continuously moving an unbonded sliver of filaments having a high degree of resilience into juxtaposed relation with the bonded mat, of applying a comparatively small amount of adhesive to the mat, and of applying a comparatively light pressure to cause the filaments of the sliver in contact with the mat to adhere to the mat through the medium of the adhesive whereby the high degree of resilience of the sliver is maintained.

7. A composite article of manufacture including, in combination, a foundation mat formed of glass fibers arranged in haphazard relation and bonded together, a layer of unbonded staple sliver of glass fibers arranged in substantially parallel relation on said mat, said layer of glass sliver being adhesively joined to the mat.

8. An article of manufacture including, in combination, a fibrous mat of uniplanar configuration formed of glass fibers arranged in haphazard relation, a bonding agent securing said fibers in integrated mat formation, a plurality of slivers assembled on and secured to the mat, each of said slivers being formed of staple glass fibers arranged in substantially parallel relation, the transverse edge zones of each sliver being comparatively thin and in overlapping relation with the adjacent sliver.

9. A separator for use in storage batteries including, in combination, a substantially rigid mat formed of glass fibers bonded together, a quantity of unbonded glass sliver arranged on each side of said mat, the filaments of the sliver being disposed in substantially parallel relation, the filaments of said sliver contacting the mat being adhesively joined to said mat.

10. An article of manufacture including, in combination, a fibrous mat of uniplanar shape formed of glass fibers arranged in haphazard relation, a bonding agent securing said fibers in integrated mat formation, a plurality of slivers assembled on the mat, each of said slivers being formed of staple glass fibers arranged in substantially parallel relation, the transverse edge zones of each sliver being comparatively thin and in overlapping relation with the adjacent sliver, the fibers of the slivers contacting the mat being adhesively joined to the mat.

References Cited in the file of this patent

UNITED STATES PATENTS

| Number | Name | Date |
|---|---|---|
| 2,015,006 | Ekisler | Sept. 17, 1935 |
| 2,117,371 | Slayter | May 17, 1938 |
| 2,152,901 | Manning | Apr. 4, 1939 |
| 2,230,271 | Simpson | Feb. 4, 1941 |
| 2,234,560 | Keyes | Mar. 11, 1941 |
| 2,311,704 | Simison | Feb. 23, 1943 |
| 2,454,100 | Slayter | Nov. 16, 1948 |
| 2,477,555 | Roberts et al. | July 26, 1949 |
| 2,484,787 | Grant | Oct. 11, 1949 |
| 2,511,887 | Vinal | June 20, 1950 |
| 2,552,124 | Tallman | May 8, 1951 |
| 2,574,221 | Modigliani | Nov. 6, 1951 |

FOREIGN PATENTS

| Number | Country | Date |
|---|---|---|
| 154,083 | Great Britain | Nov. 25, 1920 |
| 832,939 | France | July 11, 1938 |
| 875,272 | France | Sept. 14, 1942 |

OTHER REFERENCES

Publication—Philco, Circular Form BD-595, page 2, August 1944.